(12) United States Patent
Magnusson (10) Patent No.: US 10,809,426 B2
(45) Date of Patent: Oct. 20, 2020

(54) WIDEBAND RESONANT REFLECTORS WITH ZERO-CONTRAST GRATINGS

(71) Applicant: Robert Magnusson, Arlington, TX (US)

(72) Inventor: Robert Magnusson, Arlington, TX (US)

( * ) Notice: Subject to any disclaimer, the term of this patent is extended or adjusted under 35 U.S.C. 154(b) by 75 days.

(21) Appl. No.: 14/730,873

(22) Filed: Jun. 4, 2015

(65) Prior Publication Data

US 2015/0369976 A1 Dec. 24, 2015

Related U.S. Application Data

(60) Provisional application No. 62/015,656, filed on Jun. 23, 2014.

(51) Int. Cl.
*G02B 5/18* (2006.01)
*G02B 1/00* (2006.01)
*G02B 5/08* (2006.01)

(52) U.S. Cl.
CPC .......... *G02B 5/1861* (2013.01); *G02B 1/002* (2013.01); *G02B 5/08* (2013.01)

(58) Field of Classification Search
None
See application file for complete search history.

(56) References Cited

U.S. PATENT DOCUMENTS

| 5,119,231 A * | 6/1992 | Nelson | G02B 5/1814 359/359 |
| 2010/0055475 A1* | 3/2010 | Verschuuren | B44C 1/24 428/447 |
| 2010/0208346 A1* | 8/2010 | Britten | B29D 11/0073 359/576 |

(Continued)

FOREIGN PATENT DOCUMENTS

WO    WO 2007089073 A1 *   8/2007    ............. G02B 1/115

OTHER PUBLICATIONS

R. Magnusson, "Resonant reflectors designed with zero-contrast gratings", Jan. 2014.*

(Continued)

*Primary Examiner* — Charlie Y Peng

(57) ABSTRACT

Disclosed is a new class of wideband reflectors that are relatively insensitive to deviations from the design parameters. The reflectors are materially sparse while providing high reflectance across wide spectral bands. In some embodiments, a device comprises a substrate and a grating layer disposed on the substrate, wherein the grating layer comprises a periodic grating structure and a sublayer beneath the grating structure and adjacent to the substrate, the grating layer and the sublayer having the same index of refraction. These compact, low-loss elements complement conventional thin-film reflectors while possessing properties not available in thin-film multilayer stacks. The reflectors are based on a fundamental resonance effect, the guided-mode resonance effect, that occurs in periodic structures. Disclosed herein are both one-dimensional and two-dimensional reflectors m zero-contrast embodiments. The disclosed reflectors can be used in various electromagnetic spectral regions for various useful applications.

13 Claims, 6 Drawing Sheets

(a)

(b)

(56) References Cited

U.S. PATENT DOCUMENTS

| | | | |
|---|---|---|---|
| 2011/0188806 A1* | 8/2011 | Peng ................ | G02B 6/12007 |
| | | | 385/37 |
| 2013/0058370 A1* | 3/2013 | Chang-Hasnain ..... | B82Y 20/00 |
| | | | 372/50.11 |
| 2015/0117817 A1* | 4/2015 | Chen ................ | G02B 27/4233 |
| | | | 385/37 |
| 2017/0082786 A1* | 3/2017 | Magnusson .......... | G02B 5/1809 |

OTHER PUBLICATIONS

M. Shokooh-Saremi, et al., "Properties of two-dimensional resonant reflectors with zero-contrast gratings", Optics Letters / vol. 39, No. 24 / Dec. 15, 2014.*

R. Magnusson, "Wideband reflectors with zero-contrast gratings", Aug. 1, 2014 / vol. 39, No. 15 / Optics Letters.*

* cited by examiner (a)          (b)

Prior Art

Prior Art

FIG. 13

WIDEBAND RESONANT REFLECTORS WITH ZERO-CONTRAST GRATINGS

CROSS REFERENCE TO RELATED APPLICATION

This application claims priority pursuant to 35 U.S.C, § 119(e) to U.S. Provisional Patent Application Ser. No. 62/015,636, filed on Jun. 23, 2014, which is hereby incorporated by reference in its entirety.

FIELD

This invention relates to optical devices and, in particular, to reflectors fashioned with zero-contrast gratings exhibiting resonant reflection with wide bandwidth while possessing stability relative to deviation from design parameters as expected under practical fabrication conditions.

BACKGROUND OF THE INVENTION

Light's interaction with periodic surfaces and films is of great scientific and technological interest. Numerous device concepts in nanoplasmonics and nanophotonsonics are grounded in intricate resonance effects arising on properly designed structures. In particular, if incident tight couples strongly to a periodic medium, attendant resonance effects may impose diverse spectral signatures on the output light. For structures with subwavelength periods, no high-order diffracted waves exist and the resonance interaction can be particularly efficient. Filters and reflectors constitute useful classes of devices extractable from the set of resonance elements. Herein, reflectors designed with dielectrics and semiconductors whose basis for operation is the guided-mode resonance effect are disclosed.

Periodically patterned films exhibit strong resonance effects that originate in quasi-guided, or leaky, waveguide modes [R. Magnusson and S. S. Wang, "New principle for optical filters," Appl. Phys. Lett., vol. 61, no. 9, pp. 1022-1024, August 1992; S. S. Wang and R. Magnusson, "Theory and applications of guided-mode resonance filters," Appl. Opt., vol. 32, no. 14, pp, 2606-2613, May 10, 1993]. With thickness and period on the order of the wavelength, these compact elements yield versatile photonic spectra and surface-localized energy states. Using powerful electromagnetic design methods, the spectral bands of these subwavelength resonant, leaky-mode elements can be engineered to achieve photonic devices with practical attributes. For example, a single periodic layer with one-dimensional periodicity enables narrow-line filters, polarizers, reflectors, and polarization-independent elements [Y. Ding and R. Magnusson, "Resonant leaky-mode spectral-band engineering and device applications." Opt. Express. vol. 12, no. 23, pp. 5661-5674, Nov. 15, 2004].

Explaining further, materials that are artificially structured on micro- and nanoscales are foundational in the present context. Such materials exhibit electronic and photonic properties that differ dramatically from those of the corresponding bulk entity. In particular, periodic lattices are of immense interest owing to their applicability in numerous optical systems and devices including communications, medicine, and laser technology. When the lattice is confined to a layer thereby forming a periodic waveguide, an incident optical wave may undergo a guided-mode resonance (GMR) upon coupling to a leaky eigenmode of the layer system. The external spectral signatures can have complex shapes with high efficiency in both reflection and transmission. It has been shown that subwavelength periodic leaky-mode waveguide films provide various spectral characteristics and field-enhancement attributes [R. Magnusson, Y. Ding, K. J. Lee, D. Shin, P. S. Priambodo. P. P. Young, and T. A. Maldonado, "Photonic devices enabled by waveguide-mode resonance effects in periodically modulated films," in Proc. SPIE Nano-and Micro-Optics for Information Systems, Diego. Calif., vol. 5225, pp. 20-34, 2003; Y. Ding and R. Magnusson, "Use of nondegenerate resonant leaky modes to fashion diverse optical spectra," Opt. Express, vol. 12, no. 9, pp. 1885-1891, May 3, 2004]. The spectra can be further engineered with additional layers [M. Shokooh-Saremi and R. Magnusson, "Wideband leaky-mode resonance reflectors: Influence of grating profile and sublayers," Opt. Express, vol. 16, no. 22, pp. 18249-18263, Oct. 23, 2008]. The relevant physical, properties of these elements can be explained in terms of the structure of the second (leaky) photonic stop band and its relation to the symmetry of the periodic profile. The interaction dynamics of the leaky modes at resonance contribute to sculpting the spectral bands. The spectral placement of the leaky modes, their spectral density, and their levels of interaction define device operation and associated functionality [Y. Ding and R, Magnusson, "Resonant leaky-mode spectral-band engineering and device applications," Opt Express, vol. 12, no. 23, pp. 5661-5674, Nov. 15, 2004]. Use of powerful design methods along with improved nanofabrication methods continues to unveil new applications with steadily improving performance of these fundamental photonic building blocks as the present disclosure demonstrates.

Wideband reflectors are of interest in numerous applications. GMR reflectors can be seen to complement current traditional thin-film reflectors that hold a strong commercial position. In contrast to traditional thin-film reflectors at normal incidence. GMR reflectors are polarization sensitive, which is beneficial in some applications. It is possible to implement polarisation-insensitive GMR reflectors by two-dimensional (2D) patterning [S. Peng and G. M. Morris, "Resonant scattering from two-dimensional gratings," J. Opt. Soc. Am. A, vol. 13, no. 5, pp. 993-1005, May 1996]. Polarization independence is also achievable with 1D structures but across smaller spectral bandwidths [Y. Ding and R. Magnusson, "Resonant leaky-mode spectral-band engineering and device applications." Opt Express, vol. 12, no. 23, pp. 5661-5674. Nov. 15, 2.004]. Wideband polarizers that reflect one polarization state while they transmit the other have been shown to be feasible [K. J. Lee, J. Curzan, M. Shokooh-Saremi, and R. Magnusson, "Resonant wideband polarizer with single silicon layer," Appl. Phys. Lett., vol. 98, pp. 211112-1, May 25, 2011].

Using a subwavelength silicon grating spaced by a low-index sublayer on a silicon substrate, Mateus et al. presented a flat-band, TM-polarized reflector with a 530-nm bandwidth at a center wavelength of ~1550 nm; the design achieved a remarkable unsplit 99% reflectance band extending approximately 34% relative to the center-band wavelength [C. F. R. Mateus, M. C. Y. Huang, Y. Deng, A. R. Neureuther. and C. J. Chang-Hasnaim, "Ultrabroadband mirror using low-index cladded subwavelength grating." IEEE Photon. Technol. Lett., vol. 16. no. 2. pp. 518-520. February 2004], This team then fabricated a similar wideband reflector with a two-part period reporting reflectance exceeding 98.5% over a 500-nm range [C. F. R. Mateus, M. C. Y. Huang, L. Chen, C. J. Chang-Hasnain, and Y. Suzuki, "Broad-band mirror (1.12-1.62 µm) using a subwavelength grating," IEEE Photon. Technol. Lett., vol. 16, no. 7, pp. 1676-1678, July 2004]. Later, these-structures came to be called "high-contrast gratings" [C. J. stipulation that the grating bars, or ridges, must be surrounded fully by low-index materials [C. J. Chang-Hasnain and W. Yang, "High-contrast gratings for integrated optoelectronics," *Adv. Opt. Photon.*, vol. 4, no. 3, pp. 379-440, Sep. 30, 2012]. In this case, the resonance reflection is approximated as being due to two z-propagating (see FIG. 1) waveguide modes residing in the grating bars and interfering at the output high-contrast interface to cancel the transmitted wave. This interpretation differs from the GMR view where the resonance reflection is due to retaliation of evaneseent-wave-excited lateral (x-directed in FIG. 1) modes (D. Rosenblatt. A. Sharon, and A. A. Friesem, "Resonant Grating Waveguide Structures," *IEEE J. Quantum Electron.*, vol. 33, no. 11, pp. 2038-2059, November 1997. This latter explanation is consistent with lateral leaky Bloch modes in the device, which applies to wave propagation in periodic media in general. The focus of this disclosure is on GMR devices that do not resonate according to the HCG picture as set forth in [C. J. Chang-Hasnain and W. Yang, "High-contrast gratings for integrated optoelectronics," *Adv. Opt. Photon.*, vol. 4, no. 3, pp. 379-440, Sep. 30, 2012; C. J. Chang-Hasnain, C. F. R. Mateus, M. C. Y. Huang, "Ultra broadband mirror using subwavelength grating," U.S. Pat. No. 7,304,781 B2, Dec. 4, 2007]. The elimination of the high-contrast requirement is shown to result in significantly improved reflectors allowing considerable extension of achievable bandwidths and, more importantly, a much improved tolerance to parametric deviations that is crucial in any large-scale fabrication activity and for realisation of economic value from this class of devices.

Herein, wideband resonant reflectors that are robust relative to practical parametric variations are disclosed. Such parametric variations occur on practical manufacturing of layered optical devices as there are unavoidable statistical variations in thin-film thicknesses, grating etch depths, material refractive indices, surface roughness, and the like. There exists a need for robust manufacturing of the disclosed reflectors for a variety of practical applications to bring this technology to market in an economic manner. The disclosed reflectors provide these advantages relative to previously-disclosed reflectors.

BRIEF SUMMARY OF THE INVENTION

A new class of wideband reflectors is provided. A key property of these devices is parametric stability that enables effective manufacturing with high yield. The reflectors are materially sparse while providing high reflectance across wide spectral bands. These compact elements can be made with only a single partially-etched film on a substrate. They complement commercial thin-film multilayer reflectors in wide application spaces while possessing properties not available with traditional thin-film technology. The reflectors are based on a fundamental resonance effect that is gaining global interest. Typically, optical resonance effects are highly responsive to parametric changes; hence they are often deployed as sensors as for example in guided-mode resonance sensors and surface-plasmon resonance sensors. In practical applications, where stable spectra are desired, this sensitivity is detrimental. The reflectors proposed herein overcome this sensitivity and will enable deployment of these elements in the marketplace. This is the crucial advantage that will enable mass production with practical levels of fabrication precision. The technology is applicable in various spectral frequency regions including the visible, infrared and terahertz regions.

Accordingly, the resonant reflectors provided herein are designed with gratings in which the grating ridges are matched to an identical material thereby avoiding local reflections and phase changes. This critical interface thus possesses zero refractive-index contrast; hence these devices are called "zero-contrast gratings" or ZCGs. For simple gratings with two-part periods, it is shown that zero-contrast gratings provide extremely large flattop bandwidths. For example, a silicon-on-glass device illustrated herein exhibits a 99% reflectance bandwidth of ~700 nm. These results surpass, by significant margins, those for comparable reflectors reported previously. Most importantly, the zero-contrast concept enables resonant elements whose spectral response is insensitive to small parametric errors as would occur under realistic mass-production scenarios. Very importantly, reflectors operating across somewhat smaller bandwidths can have extreme values of reflectance. An example ZCG reflector presented exhibits computed reflectance exceeding 99.99% across a 160 nm band. This class of devices enables both polarized and unpolarized reflectors via one-dimensional (1D) and two-dimensional (2D) grating architectures sometimes called photonic crystal slabs.

In a quest to overcome limitations of the state-of-the-art comparable devices, guided-mode resonant photonic lattices are under intense research and development across the world. The competition to reach commercially viable devices and associated intellectual property in this class is fierce and global. Recently, monolithic, parametrically-stable architectures for wideband reflectors were discovered. These devices incorporate zero-contrast gratings that are partially etched into a single homogeneous layer. The design is convenient in fabrication and robust in applications. These single-layer devices can be fabricated on a substrate or as membranes. They avoid the multiple interfaces and associated issues in commercial multilayer reflectors. Thermal expansion effects and adhesion problems are minimized. They can be conveniently fabricated and deployed in spectral regions where thin-film fabrication is impractical or impossible. They can have wide angular apertures and tolerances. The numerous innovative aspects of this technology presented herein can influence and advance development of other classes of resonance devices including filters and polarizers. The application space for the reflectors is wide particularly at mid-to-far infrared wavelengths where multilayer thin-film deposition is impractical. Initial applications may occur in laser manufacturing and imaging systems but many other fields of commerce will benefit from these advances as will be clearly evident to persons with ordinary skill in the art.

Additional aspects of the disclosure and related embodiments are described in more detail in the detailed description which follows.

DETAILED DESCRIPTION OF THE INVENTION

Reflector embodiments described herein can be understood more readily by reference to the following detailed description, examples, and figures. Elements, apparatus, materials and methods described herein, however, are not limited to the specific embodiments presented in the detailed description, examples, and figures. It must be recognized that these embodiments are merely illustrative of the principles of the present invention. Various modifications and adaptations will be readily apparent to those of skill in the art without departing from the spirit and scope of the invention.

To explain the technological improvements and advances associated with zero-contrast grating (ZCG) reflectors, the effect of removing the critical output interface in the prior-art high-contrast grating (HCG) picture is now briefly demonstrated. It is shown that prior-art. HCGs are sufficient but not necessary to obtain wideband resonant reflectors. In fact, it is shown that zero-contrast gratings provide wider hands and greatly improved parametric stability, inverse numerical methods are used to design zero-contrast and high-contrast reflectors and compute attendant spectra and internal field distributions in detail. Moreover, the z-directed reflections at the substrate are eliminated using an antireflection (AR) layer, thereby annihilating any local cavity resonances along that direction, where the coordinates in FIG. 1 apply.

Figure 1:
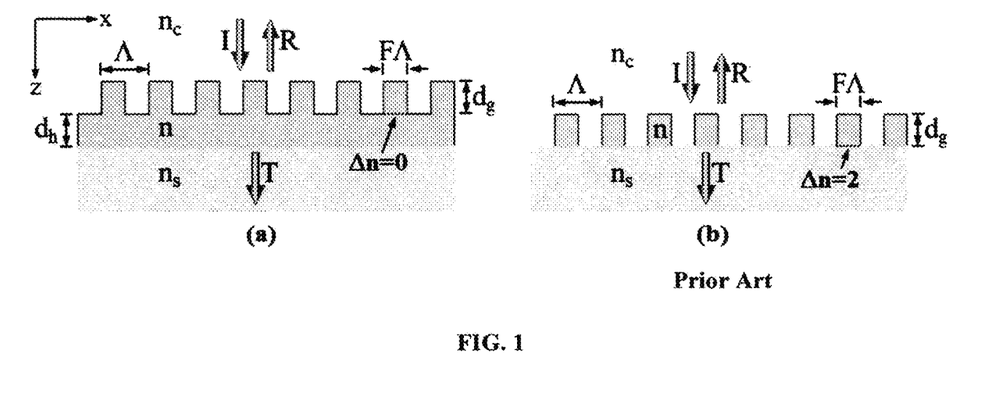
FIG. 1 illustrates a schematic model of GMR reflectors, (a) Zero-contrast resonant grating structure, (b) High-contrast resonant grating structure.

FIG. 1 schematically illustrates models of ZCG and HCG reflectors. FIG. 1(a) shows a zero-contrast grating (ZCG) matched identically to a homogeneous layer made of the same material such that no reflections or phase changes arise upon transition from the grating ridge into the layer. The refractive-index contrast in the transition plane is denoted by Δn with Δn=0 for all ZCG devices. Conversely, FIG. 1(b) defines a prior-art high-contrast grating (HCG) with a discontinuity Δn in the refractive index between the grating ridge and substrate amounting to Δn=2 in this particular example as defined by choice of materials. In FIG. 1, the thickness of the grating is $d_g$, homogeneous-layer thickness is $d_n$, the period is Λ, and the fill factor is F. For these examples, the devices are made of a partially etched (ZCG) or a fully etched (HCG) silicon layer with index of refraction n=3.48 on a glass substrate with index of refraction $n_s$=1.48. The cover refractive index is $n_c$=1 for operation in air. In FIG. 1, the symbol I represents the input plane wave with unit amplitude, R denotes reflectance, and T designates transmittance.

For simplicity and clarity, the discussion is limited to subwavelength gratings with only two parts per period as shown in FIG. 1. However, neither the subwavelength designation nor the two-part period designation Is taken as being limiting herein. Whereas the fundamental resonance effect occurs in any diffraction regime, subwavelength architectures often enable the most useful spectra as no light energy is wasted in higher-order propagation. For the computed examples, normally-incident plane waves propagating along the z-dirction in TM polarization such that the magnetic field vector is normal to the plane of incidence are assumed. However, other polarization states and off-normal incidence can be used. Further, lossless and nondispersive materials are assumed, which is a good approximation for the examples provided herein. However, in general, for highest accuracy design, use of full materials dispersion is recommended particularly when wide spectral regions are contemplated.

To achieve high-performance reflectors, particle swarm optimization (PSQ) is used to establish the device design parameters [R. Eberhart and J. Kennedy, "Particle swarm optimization," in *Proceedings of the IEEE international Conference on Neural Networks*, pp. 1942-1948, 1995: M, Shokooh-Saremi and R. Magrvusson, "Particle swarm optimization and its application to the design of diffraction grating filters," *Opt. Lett.*, vol. 32, no. 8, pp. 894-896, Apr. 15, 2007]. The fitness function (FF) is taken to be a root-mean-square type error function defined as $$FF = \left\{ \frac{1}{M} \sum_{i=1}^{M} [R_{desired}(\lambda_i) - R_{design}(\lambda_i)]^2 \right\}^{1/2}$$

in which $R_{desired}(\lambda)$ is the desired zero-order reflectance $R_0$ as a function of wavelength, $R_{design}(\lambda)$ is its PSO counterpart, and M is the number of wavelength points ($\lambda_i$s). The PSO algorithm minimizes the FF. The numerical method used to calculate final spectra and internal electromagnetic fields is based on rigorous coupled-wave analysis (RCWA) [T. K. Gaylord and M. G. Moharam, "Analysis and applications of optical diffraction by gratings" in *Proc. IEEE*. vol. 73, no. 5, pp. 894-937, 1985; M. G. Moharam, D. A. Pommel E. B. Grann, and T. K. Gaylord. "Stable implementation of the rigorous coupled-wave analysis for surface-relief gratings: enhanced transmittance matrix approach," *J. Opt. Soc. Am. A*. vol. 12, no. 5, pp. 1077-1086; May 1995]. The RCWA algorithm functions as the forward kernel in the PSO code.

Figure 2:
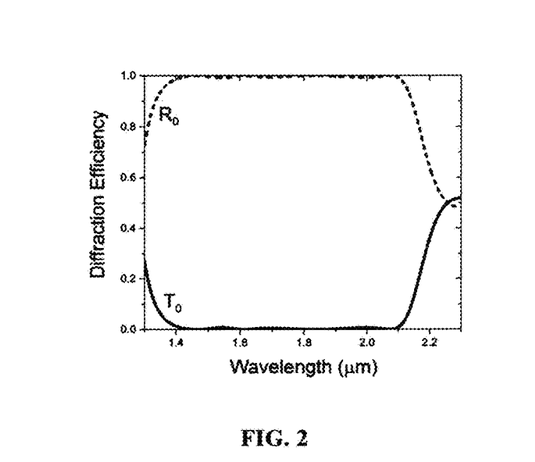
FIG. 2 illustrates a calculated spectral response of a zero-contrast GMR reflector according to one inventive embodiment described herein.

FIG. 2 illustrates the diffraction efficiency spectrum associated with a zero-contrast reflector resulting from the PSO procedure. It is found that the zero-order reflectance $R_n$ exceeds 0.99, or 99%, across a 693-nm bandwidth in the 1409- to 2102-nm wavelength range. A corresponding low zero-order transmittance band occurs in which zero-order transmittance $T_0$<0.01; that is less than 1%. This bandwidth substantially exceeds bandwidths reported previously in the literature for HCG reflectors with two-part periods. In this example, the ZCG reflector parameters are $d_g$=470 nm, $d_h$=255 nm, A=827 nm, and F=0.643. It is a silicon-on-glass device operating in air.

Figure 3:
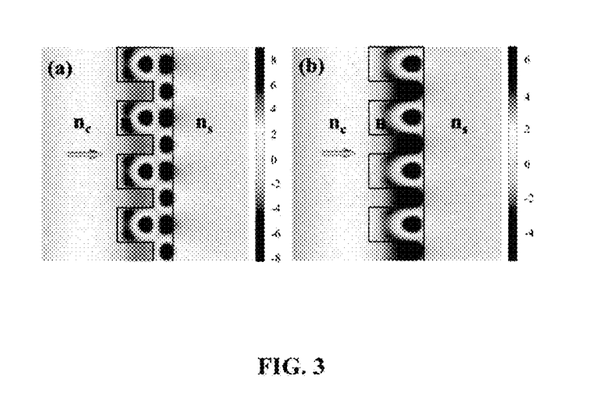
FIG. 3 depicts the internal magnetic field distribution associated with the zero-contrast GMR reflector in FIG. 2 at two distinct wavelengths.

FIG. 3 provides a view of the internal magnetic-kind amplitude at a representative instant of time for the device whose spectrum is shown in FIG. 2. In FIG. 3(a) for input wavelength of λ=1.55 μm, it is clear that the fields locate in both the grating ridges as well as in the matched homogeneous layer. Indeed, a substantial fraction of the field resides directly beneath the air space in the grating. Modeling the fields at a longer wavelength in the high-reflectance band, for example, at λ=1.95 μm, shows that the fields are pushed almost entirely into the homogeneous layer as displayed in FIG. 3(b). The improved parametric tolerance of the ZCG reflectors disclosed herein over prior-art HCG reflectors that is demonstrated in what follows is attributed in part to these internal held properties.

Figure 4:
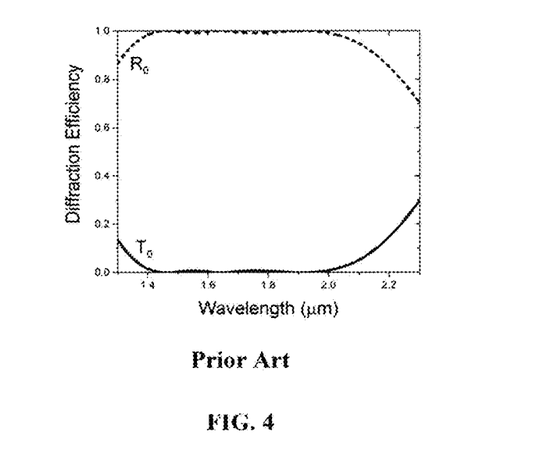
FIG. 4 illustrates a calculated spectral response of a high-contrast reflector device according to a reference prior-art embodiment described herein.

FIG. 4 illustrates the PSO-derived spectrum associated with a prior-art high-contrast reflector. In this example, the parameters are $d_g$=493 nm, A=786 nm, and F=0.707. A zero-order reflectance with $R_0$>0.99 across a 592-nm bandwidth in the 1413- to 2005-nm wavelength range is found. Again, an attendant low-transmittance band occurs in which $T_o$<0.01. This bandwidth exceeds previously reported bandwidths in HCG structures using comparable materials. For example, in [C. F. R. Mateus, M. C. Y. Huang, Y. Deng. A. R, Neureuther, and C. J, Chang-Hasnain, "Ultrabroadband mirror using low-index cladded subwavelength grating," *IEEE Photon. Technol Lett.*, vol. 16, no. 2, pp. 518-520, February 2004], enhanced by a silicon substrate, the 99% TM bandwidth is 530 nm and in [R, Magnusson and M. Shokooh-Saremi, "Physical basis for wideband resonant reflectors" *Opt. Exp.*, vol. 16, no. 5, pp. 3456-3462, Mar. 3, 2008], for silicon-on-glass, it is 520 nm. This illustrates the power of numerical optimization and, in particular, the utility of the PSO method.

In summary, resonant reflectors fashioned with HCGs and ZCGs were compared and contrasted. It was shown that ZCG reflectors provide wider flattop bandwidths than comparable prior-art HCG reflectors while exhibiting considerable parametric stability. The silicon-on-glass devices chosen for illustration exhibit 99% reflection bandwidths approaching 700 nm for Δn=0 while nearing 600 nm for Δn=2. In both cases, these results surpass those for comparable reflectors reported previously in the literature. Whereas the inverse numerical methods employed are powerful design tools, they do not guarantee global minimal fitness functions. Hence, improved results relative to those presented for the particular simple embodiments shown are not precluded.

Some embodiments described herein are further illustrated in the following non-limiting examples.

Example 1

Zero-Contrast Grating Reflector

FIG. 1(a) illustrates a generic zero-contrast grating embodiment pertinent to this disclosure, whose distinctive attributes are as described above. As shown therein, the thickness of the grating, layer is denoted by the thickness of the homogeneous sublayer is in the period is A, and the fill factor is F. In particular, the fill factor for a particular period is expressed, as a ratio of the proportion of grating structure relative to the overall period, and may be stated as F, with the measure of filled space in a period represented by FA, as seen in FIG. 1(a). There is a cover material with index of refraction of $n_c$, device material with refractive index n, and a substrate with refractive index $n_s$ on which the device of refractive index n is placed. In some embodiments, the period (A) of a reflector device described herein can be sufficiently small such that only the zero-order transmitted ($T_0$) and reflected ($R_0$) waves propagate external to the device under normal-incidence input wave. FIG. 2 illustrates the diffraction efficiency spectrum associated with a zero-contrast reflector with a particular parameter set. The zero-order reflectance $R_0$ exceeds 99%, across a 693-nm bandwidth in the 1409- to 2102-nm wavelength range. A corresponding low transmittance band occurs in which the zero-order transmittance $T_0$ is less than 1%. For this exemplary ZCG reflector of the present invention, the parameters are $d_g$=470 nm, $d_h$=255 nm, A=827 nm, and F=0.643. It is a silicon-on-glass device operating in air such that n=3.48, $n_s$=1.48, and $n_0$=1.0. The incident light is in the TM polarization state such that the electric-field vector lies in the plane of the drawing which is the plane of incidence.

Example 2

Zero-Contrast Grating Reflector with AR Layer

Figure 5:
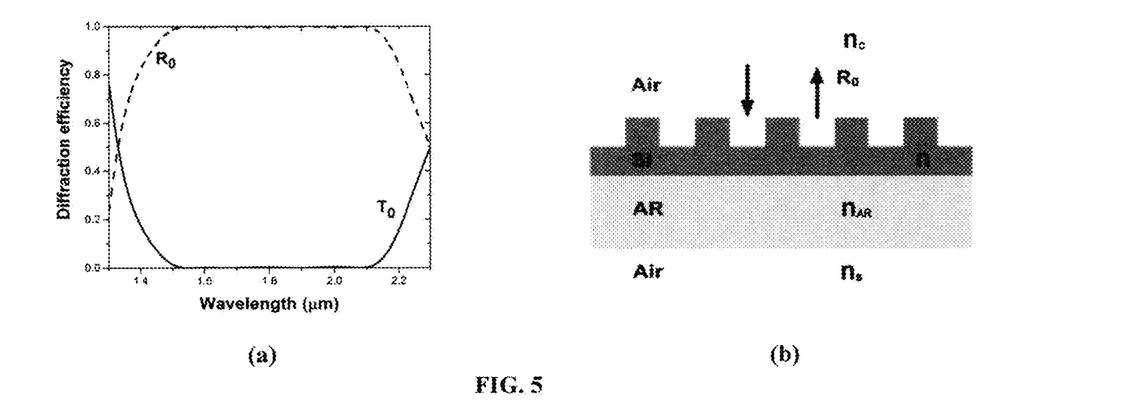
FIG. 5(a) illustrates the calculated spectral response of a zero-contrast grating GMR membrane reflector with AR coating according to one inventive embodiment described herein.
FIG. 5(b) illustrates a model of a ZCG GMR reflector device according to one inventive embodiment described herein.

Assessing the effects of eliminating the z-directed reflection at the ZCG-substrate interface, the substrate in the design in FIG. 2 is replaced with a conventional quarter-wave antireflection (AR) layer centered at 1750 nm, thereby fashioning a membrane in air, FIG. 5(a) shows the resulting zero-order spectra. It is seen that $R_0$>0.99 across a hand exceeding 600 nm in width. FIG. 5(b) shows a schematic of the ZCG membrane with the AR layer attached. The parameter set is $d_g$=490 nm, $d_h$=255 nm, AR layer thickness $d_{AR}$=235 nm, AR layer refractive index $n_{AR}$=1.865, A=827 nm, F=0.64, n=3.48, $n_s$=1.48, and $n_c$=1.0. Similar results are found if a properly designed quarter-wave AR layer is Inserted between the ZCG and the glass substrate in FIG. 2. The conventional single AR layer in FIG. 5(b) can be replaced with improved AR-layer design involving more than one layer.

Example 3

Zero-Contrast Grating Reflector with Ultrahigh Reflectance

Figure 6:
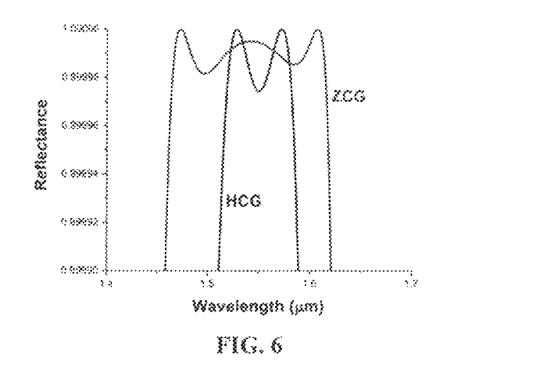
FIG. 6 illustrates a computed spectrum of a ZCG reflector and a HCG reflector wherein the zero-order reflectance exceeds 0.9999.
Figure 7:
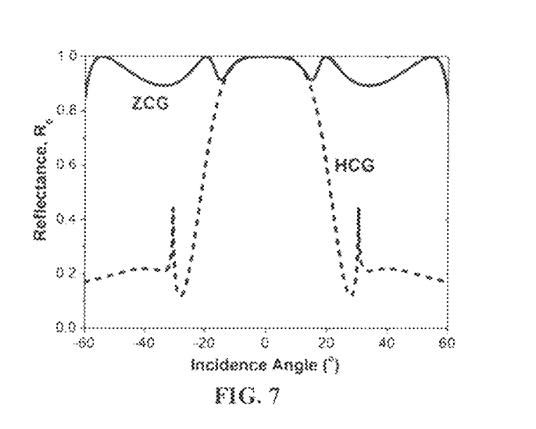
FIG. 7 illustrates the angular variation of zero-order reflectance for a ZCG reflector and a HCG reflector at λ=1550 nm.

For some applications including lasers, it is of interest to increase the reflectance beyond 0.99 to perhaps 0.9999. This can be accomplished within the PSO design strategy by relaxing the spectral bandwidth demand. For example, requiring only 100-nm flat bands for the basic architectures in FIG. 1 yields the results shown in FIG. 6, The ZCG attains $R_0$>0.9999 across 161 nm whereas the HCG only covers 77 nm. The device parameters are as follows: For the ZCG $d_g$=451 nm, $d_h$=623 nm, A=656 nm, and F=0.557; for the HCG $d_g$=490 nm, A=780 nm, and F=0.721. Refractive indices are n=3.48, $n_s$=1.48, and $n_c$=1.0 in both cases, FIG. 7 shows the angular response of these reflectors whose spectra are shown in FIG. 6 at a fixed wavelength of 1550 nm. Both devices provide $R_0$>0.98 out to θ~10°. Hero 0 is the angle of incidence measured relative to the surface normal of the device, which is the z-axis in FIG. 1, The ZCG exhibits $R_0>0.90$ for a range of ~60°; this level of angular tolerance is useful in some applications.

Example 4

Zero-Contrast Grating Reflector Under Parametric Variations

Figure 8:
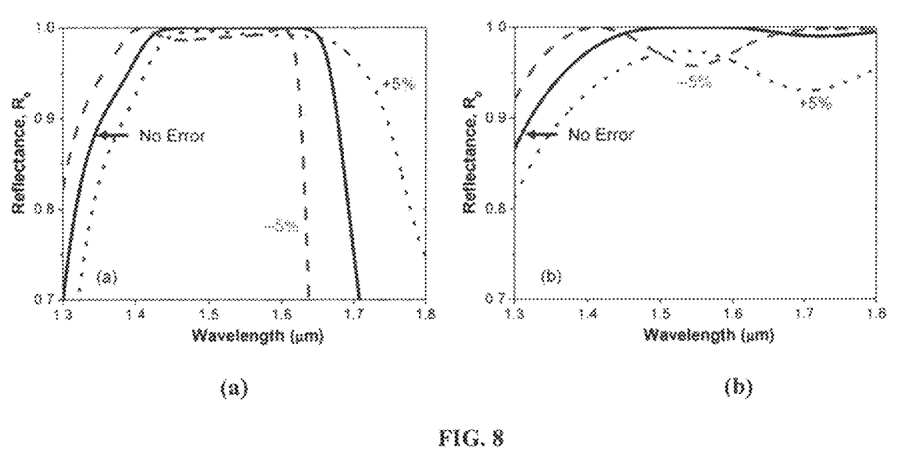
FIG. 8 illustrates the response of the ZCG and HCG reflectors with same parameters as those in FIG. 6 under ±5% errors in period, (a) ZCG structure and (b) HCG structure.
Figure 9:
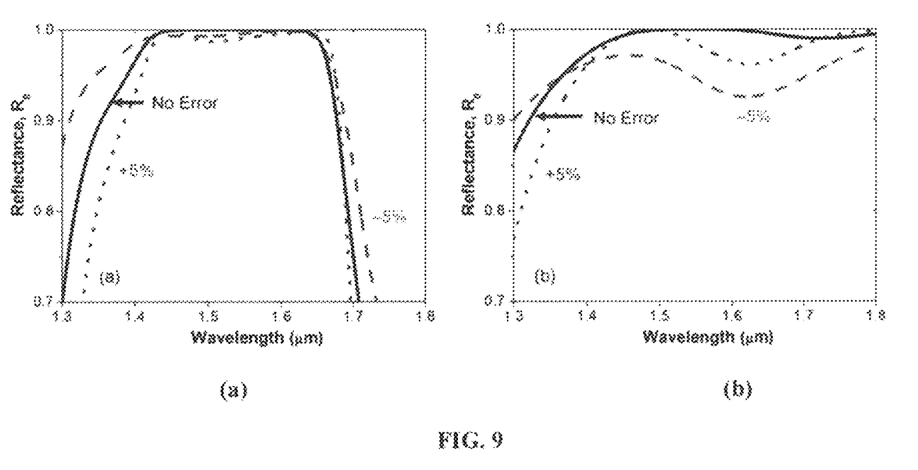
FIG. 9 illustrates the response of the ZCG and HCG reflectors with same parameters as those in FIG. 6 under ±5% errors m grating layer thickness, (a) ZCG structure and (b) HCG structure.

To illustrate the parametric stability of ZCG reflectors, representative examples are provided. Moreover, the parametric, stability is shown to greatly surpass that of prior-art HCG reflectors. The reflectors whose spectra are shown in FIG. 6 are evaluated. Thus, device parameters are as follows: For the ZCG $d_g$=451 nm, $d_h$=623 nm, $\Lambda$=656 nm, and F=0.557; for the HCG $d_g$=490 nm, $\Lambda$=780 nm, and F=0.721. Refractive indices are n=3.48, $n_s$=1.48, and $n_g$=1.0 in both cases, Deviations of 5% in the period and grating thickness are assumed. FIG. 8 shows computed reflectance spectra under ±5% errors in period for (a) ZCG reflector and (b) FICG reflector. FIG. 9 provides computed reflectance spectra under ±5% errors in grating layer thickness for (a) ZCG reflector and (b) HCG reflector. In each case shown, the ZCG reflector is considerably more robust. This is partly due to the stabilizing effect of the homogeneous layer on the internal fields in the ZCG architecture relative to the prior-art FICG architecture.

Example 5

Zero-Contrast Grating Reflectors in Various Spectral Regions

The ZCG reflectors compete with and complement current technology based on thin-film (TF) multilayers. Particularly applicable is the ~1.2- to 12-μm spectral region (motivated by available lossless materials and experimental facilities) although the near-infrared region with wavelengths of ~700-1000 nm and the visible region spanning ~400-700 nm may benefit, from the advances shown here. Moreover, this technology will be extremely interesting in the ~10- to 100-μm region as compact, low-loss, expeditiously fabricated mirrors can be realized; TF technology is unlikely to supply cost-effective reflectors in this region.

There is a limited supply of non-metal reflectors in the 1- to 2-μm region and virtually none above 2 μm. The disclosed ZCG reflector technology provides complementary solutions in the $\lambda>1.2$ μm region in the form of polarized reflectors not attainable with TF stacks at and near normal incidence. For the entire 1.2-12 μm region, compact, polarized (1D) and unpolarized (2D) GMR reflectors can be made. This is a technology gap filled by this disclosure. Thus, the disclosed reflectors compete effectively in a broad spectral application space.

Conventional multilayer dielectric thin films are widely applied to implement metal-free and thus low-loss filters, polarizers, and reflectors for incorporation in various common optical systems [J. D. Rancourt, *Optical thin films; User handbook*, SPIE Optical Engineering Press; Bellingham, 1987]. These devices typically consist of stacks of homogeneous layers deposited with precise thicknesses and tight control of index of refraction and absorption. In many cases, a large number of layers, perhaps ~10-100, may be needed to create the spectral, polarization, and angular attributes required for a particular application. These optical devices operate on the basis of multiple reflections between the interfaces incorporated in a layered stack. In particular, periodic quarter-wave layer systems provide classical high reflectors for bulk laser cavities as well as integrated distributed Bragg reflectors for vertical cavity lasers. Bragg reflectors yield efficient reflection across wide spectral bands [H. A. Macleod, *Thin-Film Optical Filters*, McGraw-Hill: New York, 1989].

The field of thin-film: optics is a mature technological area. There are numerous companies and/or industries producing optical filters and devices of a great variety throughout the world. These devices are typically deposited using sputtering, thermal evaporation, or electron-beam evaporation in vacuum chambers. Examples of currently marketed devices utilizing multilayered arrangements include laser mirrors, polarizers, antireflection film systems, bandpass filters, bandstop filters, edge filters, low-pass filters, high-pass filters, phase plates, tunable optical devices and/or filters, sensors, modulators, polarization control devices, hyper-spectral arrays, sensor arrays, high-power lasers, high-Q optical cavities, high-finesse interferometers, and beam splitters. Practical issues in TP manufacturing include adhesion difficulties associated with forming the multilayered stacks as well as losses inherently associated with multilayered arrangements. Delaminabon failures under thermal expansion and high-power laser irradiation can occur. Nevertheless, this technology has systematically advanced over a very long time, overcoming many of these issues, and is now the basis of robust economic activity.

The mid-to-far IR domain is of high interest for the proposed reflector solutions. $CO_2$ lasers operating in the 10-∥m wavelength band are used in manufacturing, medical, and military applications. The global market for lasers and laser systems for materials processing and $CO_2$ lasers and fiber lasers is substantial. The ZCG broadband mirrors can replace metallic mirrors enabling compact, light-weight, low-loss laser systems and associated optics for high-power beam delivery. In the mid-IR domain, high-power fiber lasers are under development for endoscopic microsurgery, IR-spectroscopic molecular composition analysis, and remote atmospheric monitoring. Rare-earth ion dopants such as $Er3+$, $Tm3+$, $Ho3+$, $Pr3+$, and $Dy3+$ are used as raid-IR emitters in the ~2- to 4 μm wavelength range [S. D. Jackson, "Towards high-power mid-infrared emission from a fiber laser," *Nat. Photon.* vol. 6, pp. 423-431, Jun. 28, 2012]. The ZCG reflectors can be directly integrated with the fiber end-facet to produce compact and mechanically stable mid-IR fiber lasers. Thus, fiber lasers with integrated or external ZCG-enabled cavities may generate additional markets for this technology. Future markets in infrared imaging systems for military applications as well as in the far-infrared THz Imaging domain are on the horizon.

Figure 10:
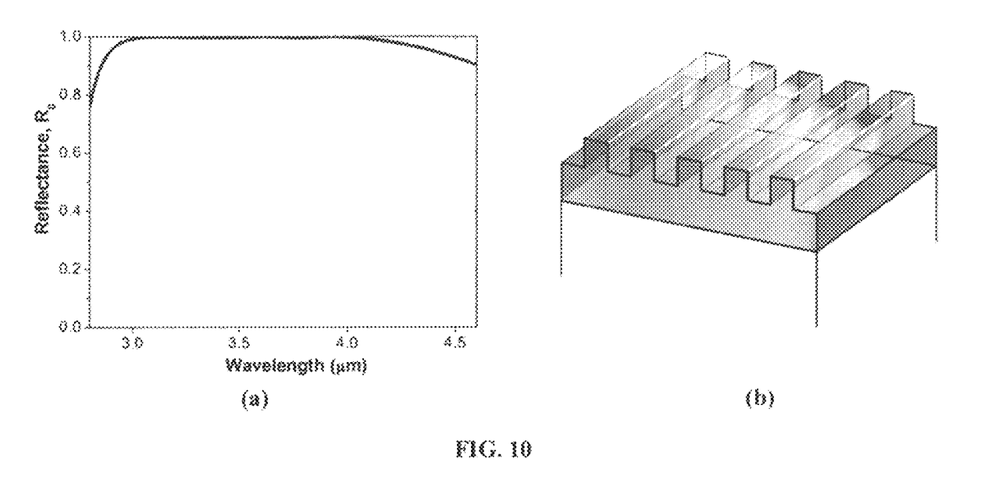
FIG. 10 illustrates a calculated spectral response and model of a zero-contrast GMR reflector according to one Inventive embodiment described herein, (a) Zero-order reflectance and (b) model.

FIG. 10(a) shows the zero-order reflection spectrum pertinent to a Ge-based ZCG reflector design resonating in the 3- to 4-μm band. It generates $R_0>99\%$ across a band extending ~1150 nm while retaining a total thickness of only ~1 μm. The parameters defining this device are $d_g$=799 nm, $d_h$=242 nm, $\lambda$=1511 nm, F=0.624, n=4.0, $n_s$=1.42, and $n_c$=1.0. FIG. 10(b) shows a schematic of the structure.

Example 6

Polarization-Independent Zero-Contrast Grating Reflectors

Figure 11:
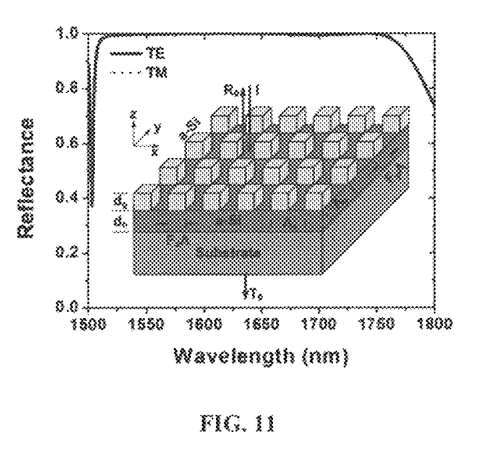
FIG. 11 illustrates unpolarized 2D ZCG reflector spectrum, with device structure shown as inset, according to one inventive embodiment described herein.

Whereas this technology provides major opportunities associated with polarized mirrors, as explained thus far in numerous examples, many applications requiring efficient wideband and unpolarized reflection exist. These applications are realizable within the ZCG class of devices by pattering in 2D rendering the spectral response insensitive to the polarization state of any incoming electromagnetic waves. Accordingly, FIG. 11 illustrates a 2D reflector design that achieves $R_0>99\%$ across 244 nm from 1515 nm to 1759 nm. This is an unpolarized silicon-on-glass reflector operating in air with device structure and key parameters shown as an inset in the figure. Parameters are $A_x=A_s=730$ nm, $F_x=F_y=0.6$, $d_g=488$ nm, $d_h=212$ nm, $n=3.48$, and $n_s=1.48$. This silicon-based device can be fabricated straightforwardly with laser inferfercmetry by rotating the sample 90° between exposures. It is possible to control whether the square pillars will be slightly rounded or completely rounded depending on exposure. The chief properties of the reflectors are not sensitive to the exact shape of the pillars; effective wide bands are obtainable with various pillar geometries. Additionally, it is noted that the transition to a 2D structure does not change the essential physics underlying the zero-contrast grating idea.

Methods

Zero-contrast grating reflectors are conveniently designed using ordinary computational resources. Analysis and design of periodic structures is expeditiously conducted using rigorous coupled-wave analysis (RCWA). This is an exact electromagnetic method to model the interaction of incident-light plane waves with multilayered periodic devices fashioned with materials generally described with complex refractive indices. Such computer codes efficiently handle general combinations of 1D and 2D periodic- and homogeneous-layered structures. These codes run extremely fast and are found to be highly reliable as verified by repeated comparisons with experimental results. Additionally, coupled-wave electromagnetic field distributions, including resonant leaky-mode amplitudes, can be conveniently and efficiently computed with RCWA. The RCWA code can be used as the forward kernel in particle, swarm optimization (PSO) codes, Yet another useful design tool is the finite-difference time-domain (FDTD) analysis method. This method can be used to model finite structures and time-varying fields.

Figure 12:
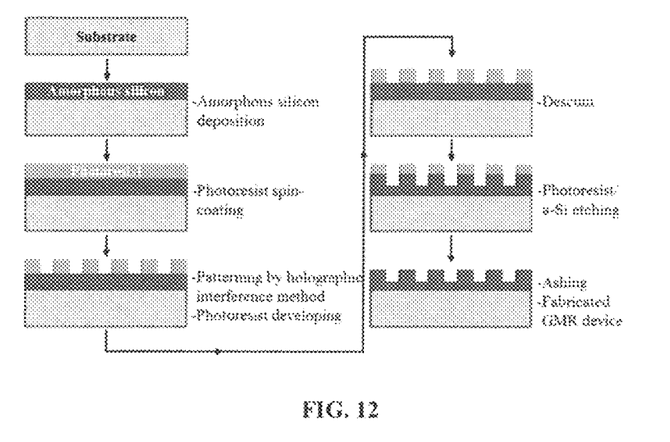
FIG. 12 illustrates an example process flow for ZCG-GMR reflector fabrication using a-Si as a representative material.

Fabrication is done with standard methods including thin-film deposition, electron-beans patterning, reactive-ion etching, metallization, SEM/AFM inspection, eilipsometric characterization, etc. Particularly, for example, with a 266-nm laser interferometer capable of recording laterally-extensive periodic patterns in a single shot with periods A>200 nm and fill factors P ranging from 0.2 to 0.8 by exposure control, patterning of both 1D and 2D periodic layers can be accomplished. An interferometer with stepper capability under computer control would enable arrays of devices on wafers up to 6 inches in diameter to be expeditiously fabricated. FIG. 12 shows a typical process flow for ZCG-GMR reflector fabrication using amorphous silicon (a-Si) as an example.

Figure 13:
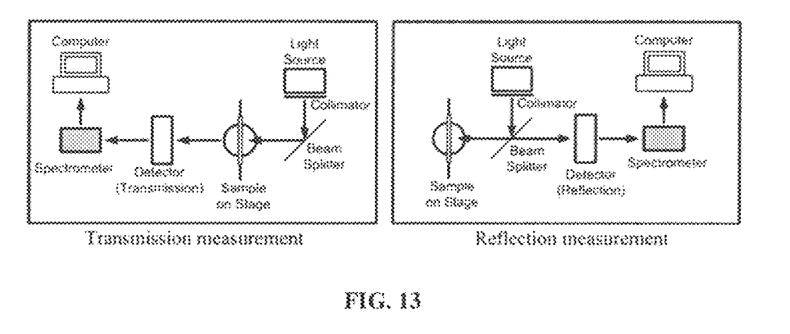
FIG. 13 illustrates a schematic view of an example spectral measurement setup.

For spectral characterization in the frequency range of interest, matching sources and spectrum analyzers are needed. FIG. 13 shows a generic setup. Ordinary means of polarization control are needed. Devices whose spectra fall within, the 1200- to 2400-nm band can be characterized for example with a Yokogawa AQ6375 spectrum analyzer in conjunction with a Koheras Super Continuum illuminating source. Longer-wavelength spectra can be measured with a Fourier-Transform Infrared Spectrometer (Shimadzu IR. Prestige FTIR for example) that covers the ~1.3- to 28-μm spectral hand with ample resolution, Reference samples with known characteristics can be used to ascertain the actual absolute values of reflectance and transmittance.

REFERENCES

1. R. Magnusson and S. S, Wang, "New principle for optical filters," *Appl. Phys. Lett*, vol. 61, no. 9, pp. 1022-1024, August 1992.
2. S. S. Wang and R. Magnusson, "Theory and applications of guided-mode resonance filters," *Appl. Opt.*, vol. 32, no. 14, pp. 2606-2613, May 10, 1993.
3. Y. Ding and R. Magnusson, "Resonant leaky-mode spectral-hand engineering and device applications," *Opt. Express*, vol 12. no. 23, pp. 5661-5674, Nov. 15, 2004.
4. R. Magnusson, Y. Ding. K. J. Lee, D. Shin. P. S. Priambodo, P. P. Young, and T. A. Maldonado, "Photonic devices enabled by waveguide-mode resonance effects in periodically modulated films," in *Proc. SPIE Nano- and Micro-Optics for Information Systems*, San Diego, Calif., vol. 5225, pp. 20-34, 2003.
5. Y. Ding and R. Magnusson, "Use of nondegenerate resonant leaky modes to fashion diverse optical spectra," *Opt. Express*, vol. 12, no. 9, pp. 1885-1891, May 3, 2004.
6. M. Shokooh-Saremi and R. Magnusson, "Wideband leaky-mode resonance reflectors: Influence of grating profile and sublayers," *Opt. Express*, vol. 16, no. 22, pp. 18249-18263, Oct. 23, 2008.
7. S. Peng and G. M. Morris, "Resonant scattering from two-dimensional gratings," *J. Opt. Soc. Am. A*, vol. 13, no. 5, pp. 993-1005. May 1996.
8. K. J. Lee, J. Curzan, M. Shokooh-Saremi, and R. Magnusson, "Resonant wideband polarizer with single silicon layer," *Appl. Phys. Lett.*, vol. 98, pp. 211112-1, May 25, 2011.
9. S. Tibuleac and R. Magnusson, "Narrow-linewidth bandpass filters with difffactive thin-film layers," *Opt. Lett.*, vol. 26, no. 9, pp. 584-586. May 1, 2001.
10. C. F. R. Mateus, M. C. Y, Huang, Y. Deng, A. R. Neureuther, and C. J. Chang-Hasnain, "Ultrabroadbaad mirror using low-index cladded subwavelength grating," *IEEE Photon. Technol. Lett.*, vol. 16, no. 2, pp. 518-520, February 2004.
11. C. F. R. Mateus, M. C. Y, Huang. L. Chen, C. J. Chang-Hasnain, and Y, Suzuki. "Broad-band mirror (1.12-4.62 μm) using a subwavelength grating," *IEEE Photon. Technol. Lett.*, vol. 16, no. 7, pp. 1676-1678, July 2004.
12. C. J. Chang-Hasnain and W. Yang, "High-contrast gratings for integrated optoelectronics," *Adv. Opt. Photon.*, vol. 4. no. 3, pp. 379-440, Sep. 30, 2012.
13. D. Rosenblatt, A. Sharon, and A. A. Frieseni, "Resonant Grating Waveguide Structures," *IEEE J. Quantum Electron.*, vol. 33, no. 11, pp. 2038-2059, November 1997.
14. C. J. Chang-Hasnain, C. F. R. Mateus, M. C. Y, Huang, "Ultra broadband mirror using subwavelength grating," U.S. Pat. No. 7,304,781 B2, Dec. 4, 2007.
15. R. Eberhart and J. Kennedy, "Particle swarm optimization," in *Proceedings of the IEEE International Conference on Neural Networks*, pp. 1942-1948, 1995.
16. M. Shokooh-Saremi and R. Magnusson, "Particle swarm optimization and its application to the design of diffraction grating filters," *Opt. Lett.*, vol. 32, no. 8, pp. 894-896. Apr. 15, 2007.
17. T. K. Gaylord and M. G. Moharam, "Analysis and applications of optical diffraction by gratings," in *Proc. IEEE*, vol. 73, no. 5, pp. 894-937, 1985.

18. M. G. Moharam, D. A. Pommet, E. B, Grann, and T. K. Gaylord, "Stable implementation of the rigorous coupled-wave analysis for surface-relief gratings: enhanced transmittance matrix approach," *J. Opt. Soc. Am. A*, vol. 12, no. 5, pp. 1077-1086, May 1995.
19. R. Magnusson and M. Shokooh-Saremi, "Physical basis for wideband resonant reflectors" *Opt. Exp.*, vol. 16, no. 5, pp. 3456-3462. Mar. 3, 2008.
20. J. D. Rancourt, *Optical thin films: User handbook SPIE Optical Engineering Press*: Bellingham, 1987.
21. H. A. Macleod, *Thin-Film Optical Filters*, McGraw-Hill: New York, 1989.
22. S. D. Jackson. "Towards high-power mid-infrared emission from a fiber laser," *Nat. Photon.*, vol. 6, pp. 423-431, Jun. 28, 2012.

That which is claimed is:

1. A parametrically stable zero-contrast grating (ZCG) reflector device having parameters and having a reflection spectrum comprising:
   a substrate region with index of refraction denoted as $n_s$ and a cover region with index of refraction denoted as $n_c$, and
   a grating layer disposed on said substrate, the grating layer comprising a periodic grating layer and a homogeneous sublayer beneath the periodic grating layer and adjacent to the substrate,
   the periodic grating layer and the homogeneous sublayer being made out of materials with the same index of refraction n,
   wherein the homogeneous sublayer acts to stabilize the reflection spectrum such that deviation in the ZCG device parameters relative to the design parameters affects the reflection spectrum of the ZCG device less than the reflection spectrum of a reference device having all the same parameters except the sublayer,
   wherein the reflection spectrum is generated by guided-mode resonance originating in quasi-guided lateral modes,
   wherein the ZCG reflector is illuminated with an incident wave having a wavelength,
   wherein the ZCG reflector has a constant period such that the incident wave interacts with a periodic grating with a single period,
   and wherein the constant ZCG reflector period is a subwavelength period such that no higher-order diffracted waves exist external to the reflector.

2. The ZCG device of claim 1, wherein the grating layer comprises a one-dimensional grating pattern.

3. The ZCG device of claim 1, wherein the grating layer comprises a two-dimensional grating pattern.

4. The ZCG device of claim 1 designed to operate in any of the spectral regions selected from the group consisting of the ~1.2- to 12-μm spectral region, the ~700-1000 nm region, the visible region spanning ~400-700 nm, the ~10- to 300-μm region, and the 0.3-40 GHz microwave region.

5. The ZCG device of claim 1 wherein the reflectance exceeds 99.99%.

6. The ZCG device of claim 1, further comprising one or more additional layers disposed between the homogeneous sublayer and the substrate.

7. The ZCG device of claim 6, wherein the one or more additional layers disposed between the homogeneous sublayer and the substrate form an antireflection layer system.

8. The ZCG device of claim 1, wherein the materials used are silicon-on-insulator or silicon-on-quartz.

9. The ZCG device of claim 1, wherein the incident light is at normal or non-normal incidence.

10. The ZCG device of claim 1, wherein the incident wave has a polarization state selected from the group consisting of randomly polarized, unpolarized, linearly polarized, elliptically polarized, and circularly polarized.

11. The ZCG device of claim 1, wherein the grating layer is made from silicon or germanium.

12. The ZCG device of claim 1, wherein the grating layer has a period configured as a multipart period.

13. The ZCG device of claim 1, wherein the periodic grating layer and the homogeneous sublayer are made out of the same material.

* * * * *